(12) United States Patent
Dubach et al.

(10) Patent No.: US 10,933,470 B2
(45) Date of Patent: Mar. 2, 2021

(54) ASSEMBLING A PART MADE OF BRITTLE MATERIAL

(71) Applicant: The Swatch Group Research and Development Ltd, Marin (CH)

(72) Inventors: Alban Dubach, Bienne (CH); Yves Winkler, Schmitten (CH)

(73) Assignee: The Swatch Group Research and Development Ltd, Marin (CH)

( * ) Notice: Subject to any disclaimer, the term of this patent is extended or adjusted under 35 U.S.C. 154(b) by 281 days.

(21) Appl. No.: 15/741,329

(22) PCT Filed: Jul. 20, 2016

(86) PCT No.: PCT/EP2016/067288
§ 371 (c)(1),
(2) Date: Jan. 2, 2018

(87) PCT Pub. No.: WO2017/016950
PCT Pub. Date: Feb. 2, 2017

(65) Prior Publication Data
US 2018/0193921 A1 Jul. 12, 2018

(30) Foreign Application Priority Data
Jul. 24, 2015 (EP) .................................. 15178285

(51) Int. Cl.
*B22F 7/00* (2006.01)
*B22D 25/00* (2006.01)
(Continued)

(52) U.S. Cl.
CPC ............ *B22F 7/006* (2013.01); *B22D 25/005* (2013.01); *B22F 7/004* (2013.01); *B23P 11/025* (2013.01);
(Continued)

(58) Field of Classification Search
CPC ........ B22F 7/006; B22F 7/004; B22D 25/005; G04B 19/12; G04B 13/02; B23P 11/025
(Continued)

(56) References Cited

U.S. PATENT DOCUMENTS 5,151,246 A * 9/1992 Baumeister ........... B22F 3/1125
264/44
2006/0141894 A1 6/2006 Hippke et al.
(Continued)

FOREIGN PATENT DOCUMENTS

CA 2753377 A1 * 8/2010 ................ F16L 9/02
CH 699 147 B1 1/2010
(Continued)

OTHER PUBLICATIONS

JWO 2007095878 A1 machine translation of the description (Year: 2007).*

(Continued)

*Primary Examiner* — Jessee R Roe
*Assistant Examiner* — Michael Aboagye
(74) *Attorney, Agent, or Firm* — Oblon, McClelland, Maier & Neustadt, L.L.P.

(57) ABSTRACT

A process for assembling a device including first and second parts made of first and second materials, respectively, and a third part made of a third material that acts as an intermediate part enabling the assembling, the process including: providing a preform made from an at least partially amorphous metal material capable of increasing its volume under temperature and pressure conditions; placing the first and second parts with the preform between two cavity plates having, the negative shape of the device; heating the assembly to a temperature between the glass transition temperature and the crystallization temperature of the preform to enable, at latest during the heating, the preform to be in a form of (Continued)

a foam and enable expansion of the preform to fill the negative shape of the device and form the third part; cooling the assembly to solidify the preform and separate the device from the cavity plates.

12 Claims, 3 Drawing Sheets

(51) Int. Cl.
    *G04B 13/02*     (2006.01)
    *G04B 19/12*     (2006.01)
    *B23P 11/02*     (2006.01)

(52) U.S. Cl.
    CPC ............ *G04B 13/02* (2013.01); *G04B 19/12* (2013.01); *B22F 2998/10* (2013.01)

(58) Field of Classification Search
    USPC ............ 75/415; 228/262.31, 262.61, 262.42, 228/262.51, 262.21
    See application file for complete search history.

(56) References Cited

U.S. PATENT DOCUMENTS

| | | |
|---|---|---|
| 2007/0048164 A1 | 3/2007 | Demetriou et al. |
| 2007/0290339 A1 | 12/2007 | Suh et al. |
| 2012/0090933 A1 | 4/2012 | Conus et al. |

FOREIGN PATENT DOCUMENTS

| | | |
|---|---|---|
| DE | 199 08 867 A1 | 9/2000 |
| DE | 199 12 618 A1 | 9/2000 |
| DE | 199 39 518 A1 | 9/2001 |
| EP | 2 442 189 A1 | 4/2002 |
| EP | 1 677 332 A2 | 7/2006 |
| WO | WO 2007095878 A1 * | 8/2007 |

OTHER PUBLICATIONS

International Search Report dated Nov. 9, 2016, in PCT/EP2016/067288 filed Jul. 20, 2016.

\* cited by examiner

ASSEMBLING A PART MADE OF BRITTLE MATERIAL

The present invention relates to a device comprising a first part made from a first material and at least one second part made from a second material, characterized in that the second part is made from a foam and assembled to the first part.

The technical field of the invention is the field of fine mechanics.

TECHNOLOGICAL BACKGROUND

There are many methods for producing an assembly of a first part with a second part, these methods possibly being adhesive bonding or brazing or riveting, etc.

However, although each method has its own advantages and drawbacks, it should be pointed out that the assembly of dissimilar and/or brittle materials is complicated.

Indeed, there are many devices that use at least one element made of a brittle material. For example, the horological world is beginning to use silicon which is a metalloid used for its magnetic properties and, its insensitivity to temperature variations during common use. This is why it is used for horological applications, in particular for regulating members such as the hairspring or gear trains.

Nevertheless, silicon has the drawback of having a very small plastic range. Silicon is, a brittle material that has a tendency to break when subjected to too high a stress.

Yet, when a silicon gear train is produced, the latter is intended to be fastened to a shaft so as to be placed in the movement of the watch. The fastening of this gear train to the shaft is carried out by various methods.

A first method consists in driving said gear train onto the shaft like for a conventional brass gear train. Yet driving consists of a force fitting of said shaft in the hole of the gear train. As silicon is a brittle material, the driving is very difficult since a high stress is applied to the silicon part and this generally causes the parts to break.

Another method consists in using brazing/welding to fasten the silicon part to its support. However, this technique is also problematic since in, order to have a chance of welding a ceramic or silicon material, it is necessary to resort to reactive brazes/welds using temperature cycles and an inert atmosphere or a high vacuum. This leads to very long assembly cycles and risks of rupture/cracking of the silicon.

Furthermore, adhesive bonding may also be used but the latter leads to risks of degassing of organic compounds that are detrimental for the operation of the movement and may pose problems of aging (exposure of the adhesive to ultraviolet rays for skeleton movements).

SUMMARY OF THE INVENTION

The objective of the invention is to overcome the drawbacks of, the prior art by proposing to provide a process for assembling at least two parts to one another that enables the fastening of two parts in a simple and safe manner with no limitation regarding the nature of the parts fastened together.

For this purpose, the invention relates to a process for assembling a device comprising a first part and a second part, said first part being made of a first material and said second part being made of a second material, said device additionally comprising a third part made of a third material that acts as an intermediate part enabling the assembly, characterized in that said process additionally comprises the following steps:

providing a preform made from the third material, said third material being an at least partially amorphous metal material capable of increasing its volume under temperature and pressure conditions;

providing said first and second parts and placing them with the preform between two cavity plates having the negative shape of the device;

heating the assembly to a temperature between the glass transition temperature Tg and the crystallization temperature Tx of the preform in order to enable, at the latest during this step, the preform to form a foam and to enable an expansion of said preform in order to fill the negative shape of the device and form said third part;

cooling the assembly in order to solidify the preform and separate the device from the cavity plates.

In a first advantageous embodiment, the first part and the second part are each provided with a cavity into which the amorphous metal preform extends.

In a second advantageous embodiment, the cavity of the first part and the cavity of the second part have different shapes.

In a third advantageous embodiment, the cavity of the first part and the cavity of the second part have different variable cross sections.

In a fourth advantageous embodiment, the first part and the second part have structurings.

In a fifth advantageous embodiment, the process comprises a preliminary step of manufacturing a preform made of at least partially amorphous metal alloy foam.

In a sixth advantageous embodiment, the expansion of the foam is controlled by the temperature, the higher the temperature, the greater the expansion.

In another advantageous embodiment, the expansion of the foam depends on the density of gas in the foam, the greater the volume of trapped gas, the greater the expansion.

In another advantageous embodiment, the expansion is produced by having the pressure in the foam greater than that of the atmosphere.

The invention also relates to a device comprising a first part and a second part, a third part produced from a third material is used as intermediate part for fastening the second part to the first part, characterized in that the third part is made of an at least partially amorphous metal alloy foam.

In a first advantageous embodiment, the first part or the second part is provided with a cavity into which the amorphous metal foam forming the third part extends.

In a second advantageous embodiment, the first part and the second part are each provided with a cavity into which the amorphous metal, foam forming the third part extends.

In a third advantageous embodiment, the cavity of the first part and the cavity of the second part have different shapes.

In a fourth advantageous embodiment, the cavity of the first part and the cavity of the second part have different variable cross sections.

In another advantageous embodiment, the first part and the second part have structurings.

In another advantageous embodiment, the first part and the second part are arranged with one another to enable the presence of an interstice in which the at least partially amorphous metal alloy foam forming said third part will be shaped.

BRIEF DESCRIPTION OF THE FIGURES

The objectives, advantages and features of the process according to the present invention will appear more clearly in the following detailed description of at least one embodiment of the invention given solely by way of nonlimiting example and illustrated by the appended drawings, in which.

DETAILED DESCRIPTION

The present invention relates to a device and its assembling process, the device comprising a first part and at least one second part.

Figure 1:
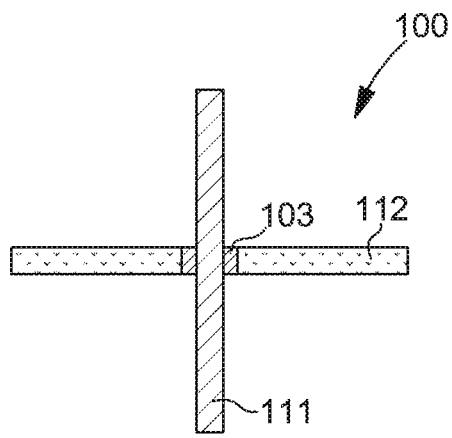
FIGS. 1 to 6 schematically represent a device and its assembling process according to a first embodiment of the invention.
Figure 2:
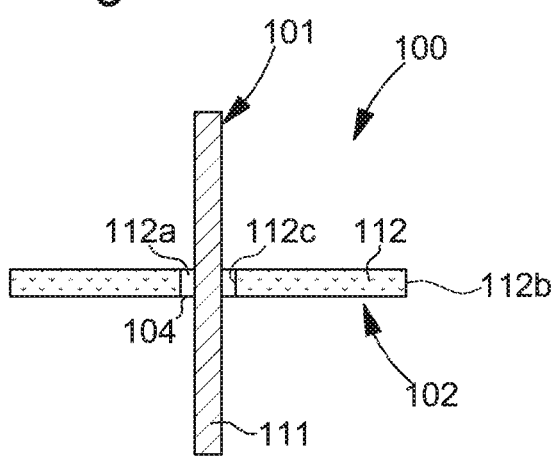

In a first embodiment that can be seen in FIGS. 1 and 2, the device 100 comprises a first part 101 and a second part 102, this second part being assembled to the first part via a third part 103 used as intermediate part. The first part 101 is made from a first material while the second part 102 is made from a second material.

Specifically, the first part 101 and the second part 102 are sized so that, when they are mounted relative to one another, an interstice 104 appears. This interstice 104 is then used so that an intermediate part 103 can be inserted therein, the latter being used as a joint.

In an example that can be seen in FIG. 2, the device 100 may for example be a wheel fastened to a shaft. It is then considered that the first part 101 is the shaft 111 and the at least one second part 102 is, the wheel 112. This wheel 112 is in the form of a circular part pierced by a central through-hole 112a. This circular part therefore comprises an outer edge 112b on which teeth may be arranged and an inner edge 112c located at the central hole 112a.

The first material and/or the second material may be materials that are conventionally used such as steel, brass, aluminum or titanium but they may also be so-called brittle materials. A brittle material is understood to mean a material that has no exploitable plastic deformation such as for example quartz, ruby, sapphire, glass, silicon, graphite, carbon or a ceramic such as silicon nitride and silicon carbide or a cermet-type composite. It is then understood that a part made from such a material is very brittle.

The wheel 112 is then assembled on the shaft 111 so as to form the device 100.

Advantageously, according to the invention, the third part or intermediate part 103 acting as a joint is made of a third material, said third material being an at least partially amorphous material comprising at least one metal element such as an at least partially amorphous metal alloy, this amorphous metal material being in the form of a foam.

This metal element may be a conventional metal element of iron, nickel, zirconium, titanium or aluminum type or a precious metal element such as gold, platinum, palladium, rhenium, ruthenium, rhodium, silver, iridium or osmium. An at least partially amorphous material will be understood to mean that the material is capable of solidifying at least partially in the amorphous phase, that is to say that it is subjected to a temperature rise above its melting point that enables it to locally lose any crystalline structure, said rise being followed by a cooling to a temperature below its glass transition temperature, enabling it to become at least partially amorphous. This material may then be a metal alloy.

Other methods that do not require melting of the material can also be envisaged, such as for example by:
mechanical mixing that consists in combining materials in a ball mill in order to obtain a fine powder. Hot isostatic pressing (HIP) is then applied in order to simultaneously, compress and sinter the powder. A final heat treatment step helps to eliminate the existing internal stresses produced during a cold, compaction that may have been used;
high-energy electron/ion/atom irradiation;
deposition.

Such a foam may be produced using various techniques. A first method consists in providing an alloy and in heating it until it reaches a liquid state. At that time, gas bubbles are injected into said alloy that is in the liquid state. This injection of gas bubbles takes place before a step of rapid cooling. This rapid cooling step is carried out in order to solidify said alloy while trapping the gas bubbles.

A second method for producing such a foam consists in providing an alloy and in heating it until it reaches a liquid state. At that time, chemical agents are injected into said, alloy, that is in the liquid state. These chemical agents are gas-releasing agents so that the latter, under certain conditions, release gases. This release of gases takes place before a step of rapid cooling. This rapid cooling step is carried out in order to solidify said alloy while trapping the gas bubbles.

One variant of this second, method consists in providing a material capable of becoming a foam in order to obtain a material that only becomes an amorphous metal foam at the moment it is shaped. Specifically, the chemical agents used are release agents that release gases under certain temperature and pressure conditions. Thus, by increasing the pressure during the cooling, the release of the gas is contained. During the shaping, the increase in temperature enables the release of the gas and therefore the transformation of the material into foam.

In an alternative to this variant, the preform may be manufactured by compacting, a mixture of powders (an already amorphous metal powder with a powder of precursors) for example using hot, pressing or extrusion between the glass transition temperature Tg and the crystallization temperature Tx.

In a second variant, the chemical agents are present from the start, for example if the metal alloy is present in powder form the agents may be mixed with this metal powder before heating the mixture.

A third method for producing an amorphous metal foam, consists of successive depositions of layers of powder, each layer of powder being locally sintered by a laser beam or electron beam. This local sintering thus makes it possible, at each layer of powder, to create the pores which will make it possible to form the foam.

The process for, manufacturing and assembling said device comprises a first step that consists in providing an amorphous metal foam preform 115. This preform has a shape similar to that of the interstice. For example, in the case of a wheel 112 assembled on a shaft 111, the interstice will be annular and therefore the preform will also be annular. A mold 124 formed of two cavity plates 124a, 124b is also provided. These two cavity plates are hollowed out so as to form, when they are joined, the negative of the assembled device 100.

Figure 3:
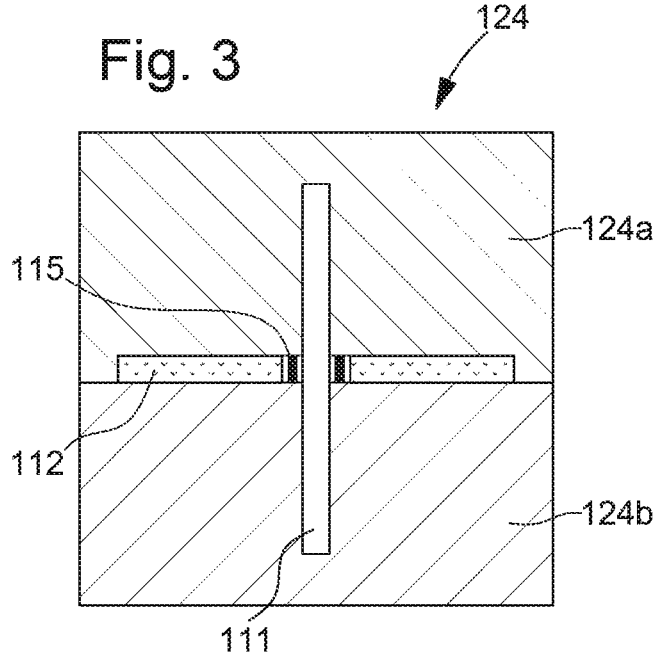
Figure 4:
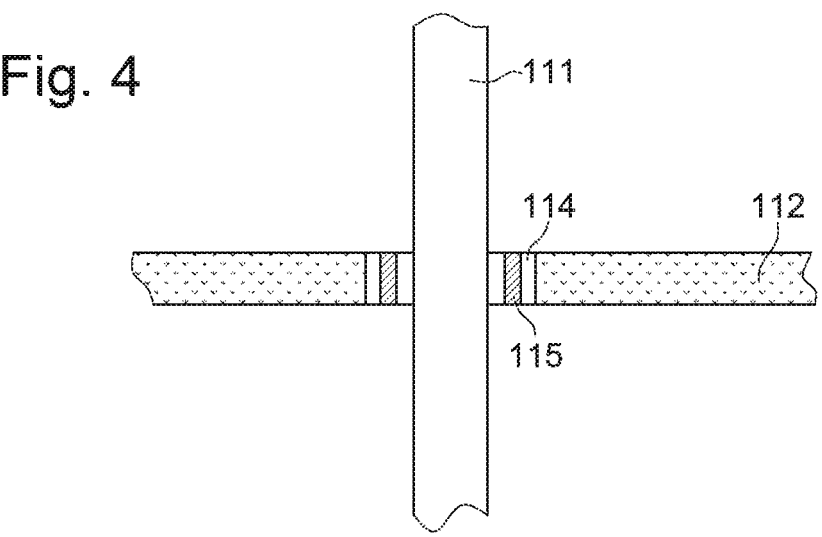

In a second step that can be seen in FIG. 3, the shaft 111, the wheel 112 and the amorphous metal foam preform 115 are placed in the negative formed by the two cavity plates 124a, 124b. The amorphous metal foam preform 115 is thus placed between the shaft 111 and the wheel 112, that is to say in its final location. However, as the preform is not the final part there is a certain floating of this preform as can be seen in FIG. 4.

Figure 5:
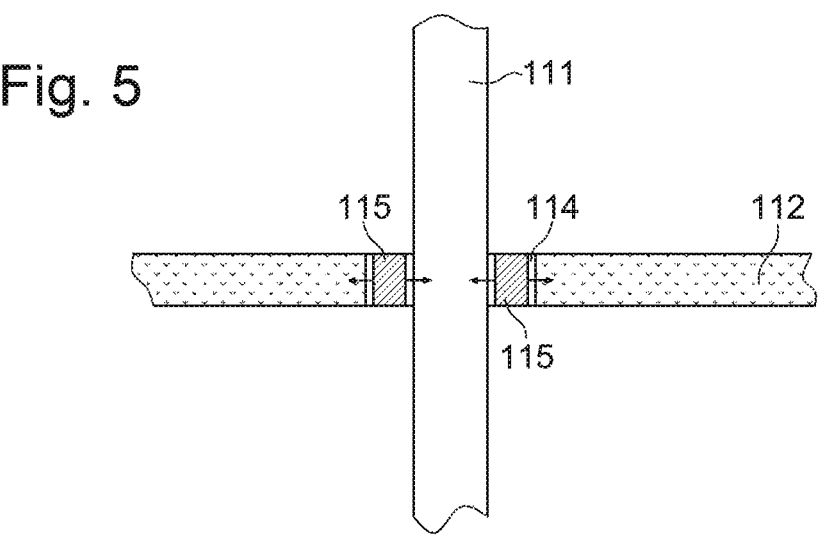

In a third step, a heating step is carried out. This heating step consists in heating the assembly to a temperature between the glass transition temperature Tg and the crystallization temperature Tx of the preform. At this temperature, the amorphous metals have a viscosity which greatly decreases, the decrease in the viscosity being dependent on the temperature. Given that the amorphous metal of the foam is in a so-called viscous state, the expansion of the gas causes an expansion of the foam preform, this preform begins to swell. Consequently, the volume occupied by the preform increases. The preform retains its amorphous state. The negative formed by the two cavity plates is sized in order to have the dimensions of the assembled final device so that, when the preform swells, the shaft 111 and the wheel 112 are wedged into their final position, the preform filling the interstice 114 between them, as can be seen in FIG. 5 and, exerts an isostatic pressure on the shaft 111 and the wheel 112.

To enable the expansion of the amorphous metal foam preform, it is necessary for the pressure in the negative to be lower than the pressure of the gas inside the preform otherwise there can be no expansion. In the case of a leaktight mold, provision could astutely be made to place the cavity formed by the two cavity plates under vacuum. In the case where the two cavity plates form a mold that is not leaktight, provision will be made for the chamber in which the mold is located to be placed under vacuum. Of course, if the pressure of the gas in the pores of the material before this material is heated is greater than the ambient pressure, i.e. the pressure in the mold, the heating step may be carried out under ambient pressure. It is just necessary to have a pressure difference between the gas in the pores and the ambient pressure.

It is possible to have foaming with a controllable viscosity, that is to say that by adjusting the temperature between Tg and Tx, it is possible to modify the viscosity of the alloy so that the expansion is faster or slower.

As the glass transition temperature Tg and the crystallization temperature Tx are lower than the melting point of said foam, this makes it possible to assemble parts with melting points lower than the melting point of the metal foam.

Finally, given that the melting point of the foam is not exceeded, the bonding remains purely mechanical and no welding takes place, i.e. there is no risk of creating undesired phases (e.g. brittle intermetallic phases).

Similarly, to prevent the stress exerted by the expansion of the preform on the shaft 111 and the wheel 112 from leading to a detachment of the two cavity plates of the mold, these two cavity plates may be fastened together via fasting means such as screws or simply by exerting a sufficient pressure on them.

Figure 6:
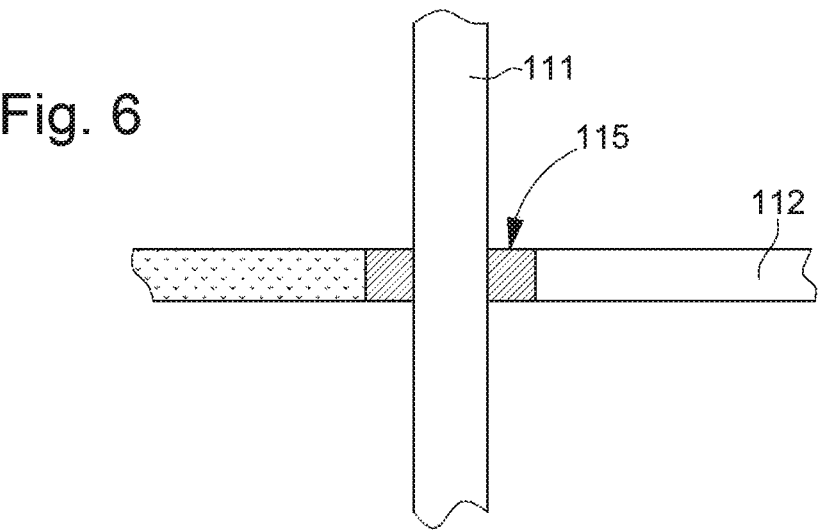

Once the expansion of the preform has been carried out and the shaft 111 and the wheel 112 are wedged into their final position with the preform 115 filling the interstice 104 between them as can be seen in FIG. 6, a cooling step is performed. This cooling step is carried out in order to solidify the amorphous metal foam preform and form the intermediate part.

The shaft 111 and the wheel 112 assembled with the intermediate part 103 are removed from the cavity plates in order to form the device 100 according to the invention.

One advantage of this embodiment is that it makes it possible to have an intermediate part that acts as a joint that enables brittle parts to be mounted without exerting excessive stresses and without having stress concentrations, the stresses exerted on the two parts being homogeneous and isostatic.

Figure 7:
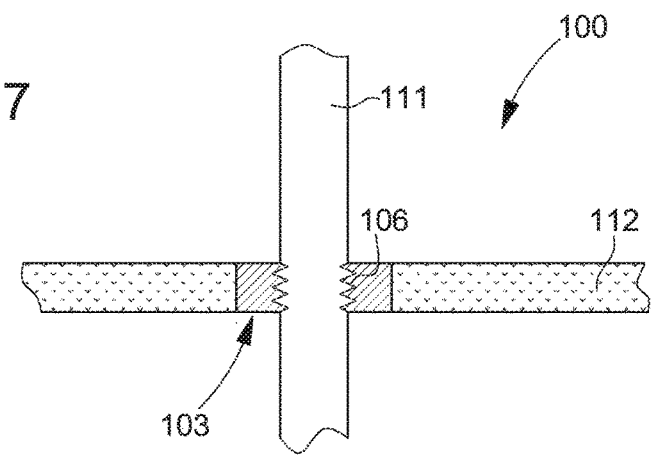
FIG. 7 schematically represents a first variant of the device according to the first embodiment of the invention.

In a first variant of this embodiment that can be seen in FIG. 7, the surface of the first part 111 and/or the second part 112 in contact with the amorphous metal foam intermediate part 103 has a structuring 106 in order to improve the roughness and therefore the attachment of the first part and of the second part with the intermediate part.

Of course, the device is not limited to a wheel fixed to a shaft and may for example be a glass mounted on a middle with bezel or two tubes mounted one in the other or any device in which an intermediate part may be used to fill an interstice and fasten two parts together. For example, the first part may be a support provided with a housing in which the second part or parts are arranged like for example a mosaic, the binder being the amorphous metal foam that exerts a pressure on the first and second parts. In another example, the first part may be a support provided with a housing in which the second part or parts are arranged, these being precise stones, the amorphous metal foam being the binder used to fasten said precious stones to the support.

Figure 9:
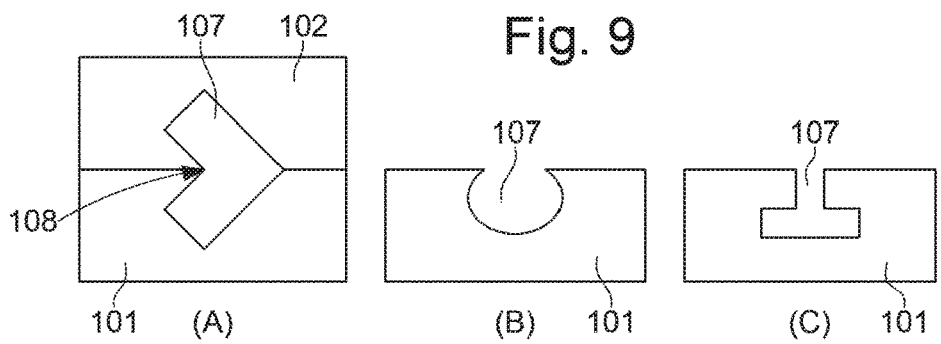

In a second variant of the embodiment that can be seen in FIG. 9 cavities 107 may be added to the structurings 106 and arranged level with the shaft and/or the wheel so as to have one cavity 107 arranged on the shaft 111 and one cavity 107 arranged on the wheel 112 that are at least partially opposite one another when the shaft 111 and the wheel 112 are assembled. These two cavities 107 opposite one another then form a housing 108. In this housing 108, the third part, referred to as the intermediate part 103, is arranged.

The process for manufacturing and assembling said device comprises a first step that consists in providing an amorphous metal foam preform. This preform has a shape that adapts or is similar to that of the housing 108 formed by the two cavities 107.

A second step consists in providing the first part and the second part and placing the preform in the housing. The shaft 111 and the wheel 112 are then aligned and then held in this position. For this, a pressing or fastening means are used.

In a third step, the heating step is carried out, this step consisting of an expansion of the foam preform. This preform begins to swell. Consequently, the volume occupied by the preform increases and leads to the housing formed by the two cavities being filled by said amorphous metal foam.

Once the expansion of the preformed has been carried out, a cooling step is performed. This cooling, step is carried out in order to solidify the amorphous metal foam preform and form the intermediate part which attaches the first and second parts.

Figure 8:
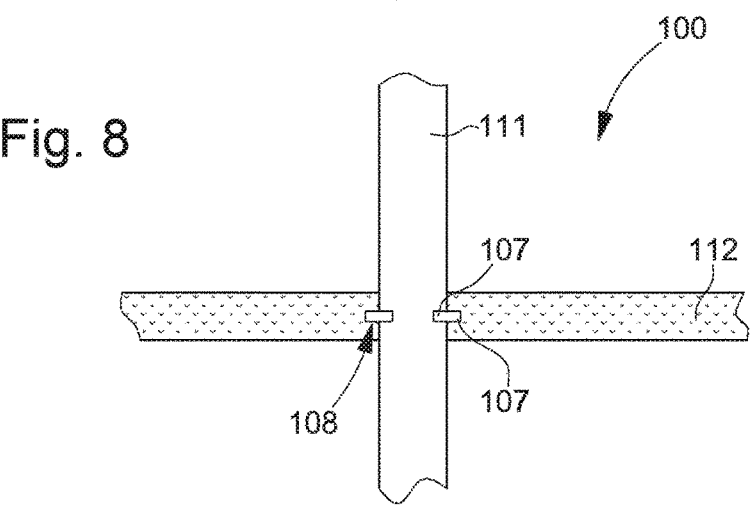
FIGS. 8 and 9 schematically represent a second variant of the device according to the first embodiment of the invention.

The first part 101 and the second part 102 assembled with the intermediate part are removed from the cavity plates in order to form the device according to the invention. This variant advantageously makes it possible to have an intermediate part 103 that is completely invisible as shown in FIG. 8.

In an alternative of the second variant of the first embodiment of the invention that can be seen in FIG. 9, the cavity 107 of the first part 111 and/or of the second part 112 has a shape that makes it possible to improve the attachment. Such a shape consists of a cavity 107, the opening of which is not constant, that is to say that the surface of said opening varies as a function of the depth. As the amorphous metal foam extends into the cavity so as to fill each recess, this makes it possible to offer additional retention. This is because, if the sidewalls of the cavity or cavities were rectilinear, pulling on one or both parts of the device could lead to a detachment of the two parts and therefore a destruction of the device. The cavity 107 may have, non-limitingly, a rectangular trapezoidal shape (A) or be spherical (B) or a T shape (C).

In a variant of the process of the various embodiments, the preform only becomes a foam during the third step. Specifically, when the foam uses precursor chemical agents that release gas under the effect of a temperature, it has previously been stated that the alloy containing these precursor chemical agents could be manufactured before these agents release the gas, making it possible to obtain a preform that is not in the form of a foam.

This possibility makes it, possible to have a process in which the step of transforming the preform into foam and the step of expanding, said foam take place at the same time. This is made possible since the release of the gas by the precursor chemical agents and the expansion of the foam occur when the material is heated.

Consequently, the process consists in providing the preform that is not in the form of a foam and placing it in the mold. Everything is then heated to a temperature that enables the precursor chemical agents to release gas. This temperature also enables the gas to expand in order to obtain an expansion of the material.

In the various embodiments, the expansion of the amorphous metal foam preform may be controlled in several ways.

A first solution consists in modifying the density of the gas bubbles during the production of the foam. One method of producing amorphous metal foam consists in injecting gas bubbles into the molten metal and in cooling it in order to trap these bubbles. The injection of gas bubbles may be controlled so that the injection of gas bubbles is more or less homogeneous and more or less dense. It will then be understood that the greater the density of the gas bubbles, the greater the volume of gas trapped in the foam. However, the greater the volume of trapped gas, the greater the expansion, will be due to the expansion of the gas during the heating step. Similarly, the density of the bubbles may be controlled by modifying the density of the precursor agents so as to vary the density of gas released.

A second solution consists in controlling the expansion of the amorphous metal foam by modifying the temperature of the heating step. Effectively, when a gas is warmed up, the amount of movement of the particles which form it increases. At constant volume, this results in an increase in the pressure, since the number of impacts between particles per unit area increases. If, the pressure must remain constant, the volume of the gas must then increase, according to the ideal gas law. Consequently, by increasing or decreasing the heating temperature during the heating step, the volume of gas trapped in the amorphous metal foam is varied and the expansion thereof is therefore modified.

In a third solution, the expansion of the amorphous metal foam is controlled by controlling the atmosphere in the heating chamber of the second embodiment or in the cavity of the mold in the first embodiment. This solution starts from the principle that the expansion is possible from the moment when the pressure of the gas trapped in the amorphous metal foam is greater than that of the atmosphere external to the foam. The ideal situation is that the external atmosphere is a vacuum sufficient so as to favor the expansion of the foam as much as possible. Therefore, by adjusting the external pressure the amplitude of the expansion of said foam is adjusted knowing that the greater the pressure of the external atmosphere, the lower the expansion of the gas.

It will be understood that various modifications and/or improvements and/or combinations that are obvious for a person skilled in the art may be made to the various embodiments of the invention disclosed above without departing from the scope of the invention defined by the appended claims.

Of course, the embodiments described above are not limited to the assembly of two or three parts, so that the number of parts is not limited.

Figure 10:
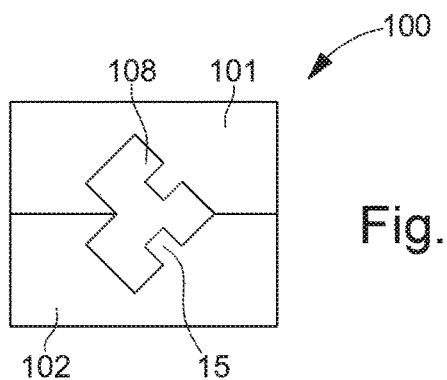
FIG. 10 schematically represents another variant of the device according to the first embodiment of the invention.

Furthermore, it can be envisaged for the cavities to be replaced or supplemented by protuberances 15 as can be seen in FIG. 10. These protuberances are the negatives of the cavities and have the same function. By that it is understood that the amorphous metal foam is shaped so as to be able to envelop this or these protuberances and improve the attachment between the first part and the second part.

The invention claimed is:

1. A process for assembling a device including a first part and a second part, the first part being made of a first material and the second part being made of a second material, the device additionally including a third part made of a third material that acts as an intermediate part enabling the assembling, the process comprising:
   providing a preform made from the third material, the third material being an at least partially amorphous metal material capable of increasing its volume under temperature and/or pressure conditions;
   providing the first and second parts and placing them with the preform between two cavity plates having a negative shape of a final device, the first part extending through an opening in the second part such that the first and second parts form an interstice in which the at least partially amorphous metal alloy foam forming the third part is inserted;
   heating the assembly to a temperature between a glass transition temperature and a crystallization temperature of the preform to enable, at latest during the heating, the preform to be in a form of an at least partially amorphous metal foam and to enable an expansion of the preform to fill the negative shape of the device and form the third part;
   cooling the assembly to solidify the preform to retain the at least partially amorphous metal foam state and separate the assembled device from the cavity plates.

2. The assembling process as claimed in claim 1, wherein the first part and the second part have structurings.

3. The assembling process as claimed in claim 1, further comprising preliminary manufacturing the preform.

4. The assembling process as claimed in claim 1, wherein the expansion of the foam is controlled by the temperature, the higher the temperature, the greater the expansion.

5. The assembling process as claimed in claim 1, wherein the expansion of the foam depends on density of gas in the foam, the greater the volume of trapped gas, the greater the expansion.

6. The assembling process as claimed in claim 1, wherein the expansion is carried out by having pressure in the foam greater than that of ambient pressure.

7. The assembling process as claimed in claim 1, wherein at least one of the first part and the second part is a brittle material.

8. The assembling process as claimed in claim 7, wherein at least one of the first part and the second part is quartz, ruby, sapphire, glass, silicon, graphite, carbon, a ceramic, or a cermet-type composite.

9. The assembling process as claimed in claim 1, wherein the second part is a wheel including teeth on an outer edge and an inner edge that forms the opening, and the first part is a shaft extending through the opening.

10. A process for assembling a device including a first part and a second part, the first part being made of a first material and the second part being made of a second material, the device additionally including a third part made of a third material that acts as an intermediate part enabling the assembling, the process comprising:

providing a preform made from the third material, the third material being an at least partially amorphous metal material capable of increasing its volume under temperature and/or pressure conditions;

providing the first and second parts and placing them within the preform between two cavity plates having a negative shape of a final device;

heating the assembly to a temperature between a glass transition temperature and a crystallization temperature of the preform to enable, at latest during the heating, the preform to be in a form of an at least partially amorphous metal foam and to enable an expansion of the preform to fill the negative shape of the device and form the third part;

cooling the assembly to solidify the preform to retain the at least partially amorphous metal foam state and separate the assembled device from the cavity plates, wherein the first part and the second part each include a cavity that, when the first and second parts are placed within the preform, the cavity of the first part is positioned opposite to the cavity of the second part to form a housing into which the amorphous metal foam forming the third part extends.

11. The assembling process as claimed in claim 10, wherein the cavity of the first part and the cavity of the second part have different shapes.

12. The assembling process as claimed in claim 10, wherein the cavity of the first part and the cavity of the second part have different variable cross sections.

* * * * *

UNITED STATES PATENT AND TRADEMARK OFFICE
CERTIFICATE OF CORRECTION

PATENT NO. : 10,933,470 B2  
APPLICATION NO. : 15/741329  
DATED : March 2, 2021  
INVENTOR(S) : Dubach et al.

Page 1 of 1

It is certified that error appears in the above-identified patent and that said Letters Patent is hereby corrected as shown below:

On the Title Page

Item [57], Line 9, delete "having," and insert -- having --, therefor.

In the Claims

Column 8, Claim 1, Lines 32-34, delete "at least partially amorphous metal alloy foam forming the third part" and insert -- preform --, therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*